(12) United States Patent
Baychar

(10) Patent No.: US 6,981,341 B2
(45) Date of Patent: Jan. 3, 2006

(54) WATERPROOF/BREATHABLE MOISTURE TRANSFER COMPOSITE CAPABLE OF WICKING MOISTURE AWAY FROM AN INDIVIDUAL'S BODY AND CAPABLE OF REGULATING TEMPERATURE

(75) Inventor: Baychar, Carrbassett, ME (US)

(73) Assignee: Solid Water Holdings, Eastport, ME (US)

( * ) Notice: Subject to any disclaimer, the term of this patent is extended or adjusted under 35 U.S.C. 154(b) by 0 days.

(21) Appl. No.: 08/887,847

(22) Filed: Jul. 3, 1997

(65) Prior Publication Data

US 2001/0009830 A1 Jul. 26, 2001

Related U.S. Application Data

(63) Continuation-in-part of application No. 08/813,438, filed on Mar. 10, 1997, now abandoned, which is a continuation-in-part of application No. 08/747,340, filed on Nov. 12, 1996, now Pat. No. 5,738,937.

(51) Int. Cl.
*A43B 13/28* (2006.01)
*B32B 5/18* (2006.01)
*B32B 3/16* (2006.01)

(52) U.S. Cl. .......................... 36/24.5; 36/30 R; 36/44; 36/55; 36/115; 36/118; 442/55; 442/221; 442/315; 428/304.4; 428/315.9

(58) Field of Classification Search ............... 36/24.5, 36/25 R, 30 R, 43, 44, 55, 115, 30; 442/118, 442/88, 85, 86, 87, 89, 90, 374, 373, 225, 442/224, 221, 261, 255, 1, 2, 22, 56, 183, 442/223, 239, 286, 315, 370, 372, 394; 428/36.1, 428/36.2, 36.3, 131, 158, 304.4–319.9
See application file for complete search history.

(56) References Cited

U.S. PATENT DOCUMENTS

| | | | |
|---|---|---|---|
| 3,607,593 A | | 9/1971 | Semenzato |
| 3,616,170 A | * | 10/1971 | Closson, Jr. |
| 3,779,855 A | | 12/1973 | Fonzi et al. |
| 3,839,138 A | * | 10/1974 | Kyle et al. |
| 4,216,177 A | | 8/1980 | Otto |

(Continued)

OTHER PUBLICATIONS

Frisby Technology Documents, No. F001006–F001009, Jun. 1996.

Olympia Sports Catalog, Olympia Performance Gloves, 1993, pp. 2–8.

MOTOPORT—1991 MOTOPORT U.S.A. Apparel and Accessory Catalog, 1991.

(Continued)

*Primary Examiner*—Arti R. Singh
(74) *Attorney, Agent, or Firm*—Mattingly, Stanger, Malur & Brundidge, P.C.

(57) ABSTRACT

The moisture transfer system includes a waterproof/breathable moisture transfer liner having an inner fabric layer selected from technically advanced fabrics which are carefully selected. A series of layers are provided outside the inner liner including foam material layers, breathable membranes, encapsulation technology, waterproof films and an outer fabric layer. The moisture transfer system in incorporated into in-line skate as either a removable liner for a shell boot or a liner for a softboot.

41 Claims, 11 Drawing Sheets

U.S. PATENT DOCUMENTS

| | | | |
|---|---|---|---|
| 4,338,366 A | 7/1982 | Evans et al. | |
| 4,338,371 A | 7/1982 | Dawn et al. | |
| 4,454,191 A * | 6/1984 | Blucher et al. | 442/224 |
| 4,482,593 A | 11/1984 | Sagel et al. | |
| 4,524,529 A * | 6/1985 | Schaefer | 36/98 |
| 4,529,641 A | 7/1985 | Holtropet | |
| 4,621,013 A | 11/1986 | Holtrop et al. | |
| 4,656,760 A * | 4/1987 | Tonkel et al. | 36/28 |
| 4,662,006 A | 5/1987 | Ross, Jr. | |
| 4,666,765 A | 5/1987 | Caldwell | |
| 4,674,204 A | 6/1987 | Sullivan et al. | |
| 4,729,179 A * | 3/1988 | Quist, Jr. | 36/44 |
| 4,756,958 A | 7/1988 | Bryant et al. | |
| 4,805,319 A * | 2/1989 | Tonkel | 36/28 |
| 4,816,328 A | 3/1989 | Saville et al. | |
| 4,823,407 A * | 4/1989 | Phillips, Jr. et al. | 2/202 |
| 4,894,932 A | 1/1990 | Harada et al. | |
| 4,909,523 A | 3/1990 | Olson | |
| 4,910,886 A | 3/1990 | Sullivan et al. | |
| 5,004,643 A | 4/1991 | Caldwell | |
| 5,021,280 A * | 6/1991 | Farnworth et al. | |
| 5,035,943 A | 7/1991 | Kinlaw et al. | |
| 5,043,209 A * | 8/1991 | Boisse et al. | 442/397 |
| 5,073,298 A * | 12/1991 | Gentle et al. | 252/358 |
| 5,092,614 A | 3/1992 | Malewicz | |
| 5,098,778 A * | 3/1992 | Minnick | |
| 5,126,182 A | 6/1992 | Lumb et al. | |
| 5,134,017 A * | 7/1992 | Baldwin et al. | |
| 5,169,712 A | 12/1992 | Tapp | |
| 5,171,033 A * | 12/1992 | Olson et al. | 280/11.22 |
| 5,209,965 A | 5/1993 | Caldwell | |
| 5,216,825 A | 6/1993 | Brum | |
| 5,224,356 A | 7/1993 | Colvin et al. | |
| 5,253,434 A | 10/1993 | Curley, Jr. et al. | |
| 5,269,862 A | 12/1993 | Nakamima et al. | |
| 5,277,954 A | 1/1994 | Carpenter et al. | |
| 5,290,904 A | 3/1994 | Colvin et al. | |
| 5,330,208 A | 7/1994 | Charron et al. | |
| 5,340,132 A | 8/1994 | Malewicz | |
| 5,342,070 A | 8/1994 | Miller et al. | |
| 5,365,677 A * | 11/1994 | Dalhgren | 36/3 A |
| 5,366,801 A | 11/1994 | Bryant et al. | |
| 5,378,529 A | 1/1995 | Bourdeau | |
| 5,380,020 A | 1/1995 | Arney et al. | |
| 5,397,141 A | 3/1995 | Hoshizaki et al. | |
| 5,398,948 A | 3/1995 | Mathis | |
| 5,415,222 A | 5/1995 | Colvin et al. | |
| 5,418,051 A | 5/1995 | Caldwell | |
| 5,431,970 A | 7/1995 | Broun et al. | |
| 5,437,466 A | 8/1995 | Meibock et al. | |
| 5,439,733 A * | 8/1995 | Paire | 428/219 |
| 5,452,907 A | 9/1995 | Meibock et al. | |
| 5,456,393 A | 10/1995 | Mathis et al. | |
| 5,499,460 A | 3/1996 | Bryant et al. | |
| 5,503,413 A | 4/1996 | Belogour | |
| 5,544,908 A | 8/1996 | Fezio | |
| 5,575,090 A | 11/1996 | Condini | |
| 5,682,613 A | 11/1997 | Dinatale | |
| 5,727,336 A * | 3/1998 | Ogden | 36/43 |
| 5,738,937 A | 4/1998 | Baychar | |
| 5,775,006 A * | 7/1998 | Breuner | 36/50.1 |
| 5,785,909 A * | 7/1998 | Chang et al. | 264/46.5 |
| 5,787,502 A * | 8/1998 | Middleton | 2/69 |
| 5,876,792 A | 3/1999 | Caldwell | |
| 5,932,299 A * | 8/1999 | Katoot | 427/508 |
| 5,970,629 A | 10/1999 | Tucker et al. | |
| 6,048,810 A | 4/2000 | Baychar | |
| 6,065,227 A | 5/2000 | Chen | |
| 6,074,966 A | 6/2000 | Zlatkus | |
| 6,200,915 B1 | 3/2001 | Adams | |
| 6,237,251 B1 | 5/2001 | Lichtfield et al. | |
| 6,474,001 B1 | 11/2002 | Chen | |
| 6,474,002 B2 | 11/2002 | Chen | |
| 6,479,009 B1 | 11/2002 | Zlatkus | |
| 6,602,811 B1 | 8/2003 | Rock et al. | |
| 2002/0012784 A1 | 1/2002 | Norton et al. | |

OTHER PUBLICATIONS

KAMIK Catalog, 1997.
LaCrosse Catalog, 1997.
Frisby Technologies Test Report—"Insulated Boot Lines Containing Microencapsulated Phase Change Materials", Dec. 12, 1995.
Frisby Technologies Test Report—"Cold Weather Boot Liners Containing COMFORTEMP Foam", Sep. 24, 1996.
"Analytical Modeling of A MicroPCM–Enhanced Diver Dry Suit", U.S. Naval Academy, Technical Report EW–20–96, Aug. 1996.
Soccer Technology Catalog, PUMA, 1992.
OUTLAST Style #1750 (Alpine 1), Product Specification, 1996.
OUTLAST Style #4330 (Alpine 2), Product Specification, 1996.
OUTLAST Alpine TRF3, Product Information Sheet, 1996.
Rodriguez, Ferdinand, "Principles of Polymer Systems", 1982, Hemisphere Publishing Corporation, $2^{nd}$ Ed., p. 362.

* cited by examiner

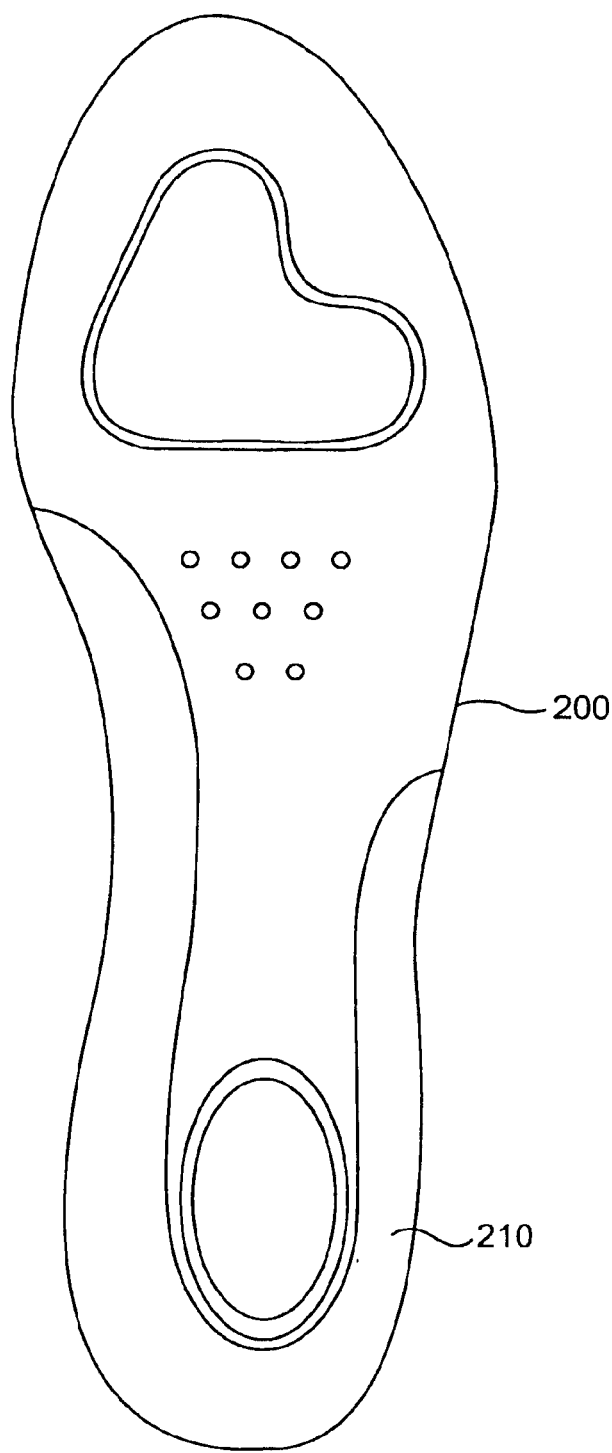 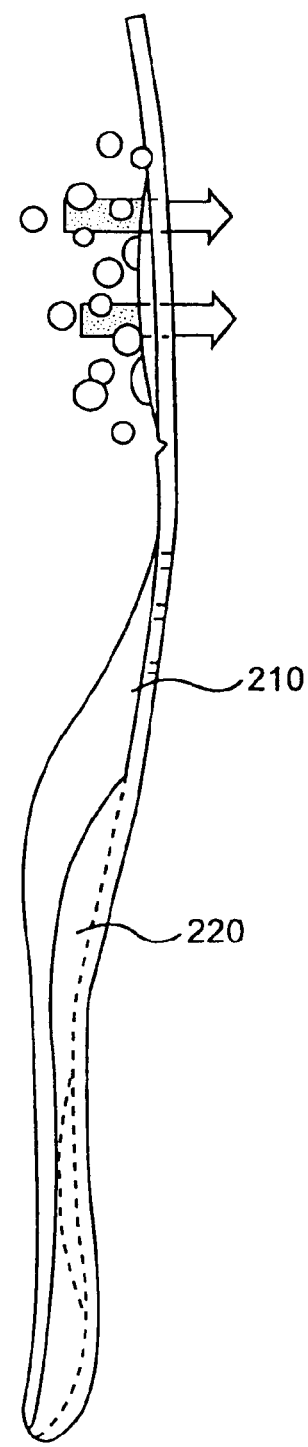
FIG. 5(a)  FIG. 5(b)

WATERPROOF/BREATHABLE MOISTURE TRANSFER COMPOSITE CAPABLE OF WICKING MOISTURE AWAY FROM AN INDIVIDUAL'S BODY AND CAPABLE OF REGULATING TEMPERATURE

This is a continuation-in-part application of Ser. No. 08/813,438, filed Mar. 10, 1997, now abandoned, which is a continuation-in-part application of Ser. No. 08/747,340 filed Nov. 12, 1996, now U.S. Pat. No. 5,738,937.

FIELD OF THE INVENTION

The present invention relates to liners used in a variety of application. For example, the liner of the present invention may be employed in a variety of applications including in-line skates (shell and soft boot) and the like. The liner is breathable and waterproof to increase comfort for the skater.

BACKGROUND OF THE INVENTION

Various types of liners are known in the prior art. These liners are designed to provide certain levels of comfort and durability. Furthermore, in-line skates are also well known in the art as evidenced by U.S. Pat. Nos. 5,340,132, 5,397,141 and 5,437,466. Of these patents, only U.S. Pat. No. 5,437,466 discloses what is commonly referred to as a "soft-boot". In other words, the shoe body is made of a soft, pliable material. General statements are provided about the materials used for the shoe body, but not in great detail.

However, the liners and in-line skates, as well as snowboard boots, etc., known in the art do not provide the advantages realized by the present invention. With the art of in-line skating becoming increasing recreational, numerous categories of skaters are developing in large numbers. The present inventor has recognized the problems faced by the aggressive and the recreational categories of skaters and has developed a liners to overcome such problems.

There is an ongoing need for comfort, breathability and support for both removable liners as well as soft boot liners. In prior removable liner designs, the conventional liner is often constructed with rigid, non-breathable outer materials, such as vinyls, foams and nylons. The inner liners have been leather, nylon or polyester blends which extremely limited the ability to breathe or wick moisture away from a skater's body. These materials have prevented the foot from breathing adequately. In the case of "shell boot" skates, the plastic material that forms the outer shell boot structure holds the heat and moisture inside the boot. As a result, the lining becomes saturated with sweat which adversely affects the skater's comfort and performance level. This problem is even worse with the aggressive skaters whose needs for proper ventilation are even greater.

SUMMARY OF THE INVENTION

An object of the present invention is to provide lining system employing a cooler and more breathable liner that meets the needs of each individual skater. Accordingly, the liner of the present invention can be accommodated to the needs of skaters of various skill categories by permitting the inner liner material, which is against the foot, to vary in fiber content and construction.

This object of the present invention is realized by providing a lining system having lining materials which act as a moisture transfer system. Moisture vapors are transferred through the liner from one side to the other side. This is accomplished by utilizing certain materials in a manner determined by the inventor after considerable experimentation and effort. The details of the specific materials as used in the combination are disclosed in the Detailed Description of the Preferred Embodiments.

The moisture transferring lining system of the present invention overcomes the problems in the prior art lining systems and liners and meets the needs of even the most aggressive skaters.

Various other objects, features and advantages of the present invention will become readily apparent in view of the following detailed description of the preferred embodiments in conjunction with the drawings.

BRIEF DESCRIPTION OF THE DRAWINGS

FIGS. 5(a) and 5(b) illustrate a sole portion of a shoe constructed according to a preferred embodiment of the present invention.

DETAILED DESCRIPTION OF THE PREFERRED EMBODIMENTS

The following detailed description of the preferred embodiments of the present invention is undertaken in connection with the drawings. This description, while undertaken with respect to the disclosed embodiments, is intended to enable a variety of different applications and slight modifications which form a part of the present invention. More specifically, many of the materials used in this lining system have been developed relatively recently, and in many cases are still being modified and improved. Where possible, tradenames of specific products have been used to assist in the understanding of the invention. The lining system according to the present invention can be easily adapted to accommodate further developments in these materials. With this in mind, the preferred embodiments currently envisioned are set forth below.

Figure 1:
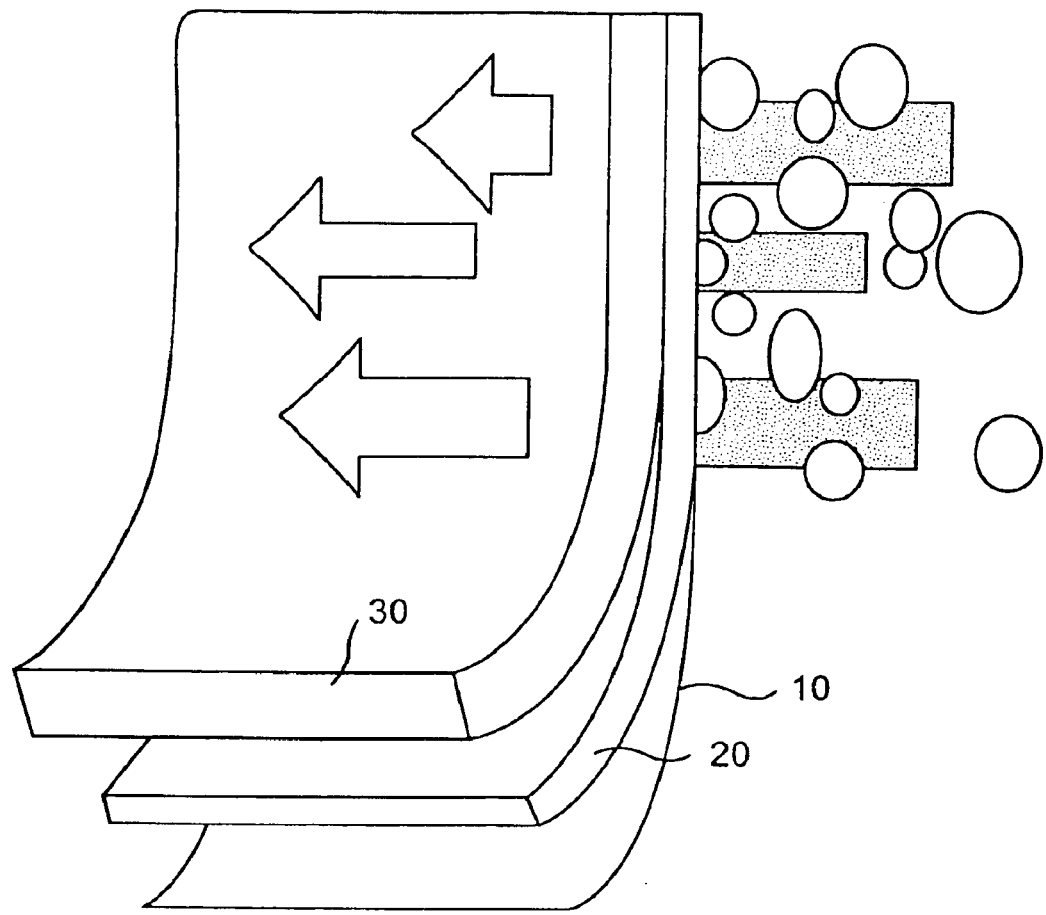
FIG. 1 illustrates a first portion of the liner according to a first embodiment of the present invention.

FIG. 1 illustrates a portion of the liner, or lining system, according to a first embodiment of the present invention. As shown in FIG. 1, a first foam material 20 is provided between an inner liner 10 and a second foam material 30. The inner liner 10 can be attached to the first foam material 20 by lamination, stitch or ultra sonically bonded or the like. The second foam material 30 is a germicidal antimicrobial reticulated and/or hydrofilic open cell foam and has a thickness of approximately ¼ inch. The first foam material is also preferably germicidal reticulated or open cell hydrofilic and has a thickness of approximately 1/16 to 1/8 inch. All of the foam materials used in the present invention are assumed to be breathable and their thicknesses variable. Depending upon the application, some of the foam materials may not be used and the thickness of any foam material that is used can be changed as needed. For example, a foam called AQUAZONE by Foamex, COMFORTEMP by Frisby or NETSORB by Vita Olympic or the like can be used. Preferably, the germicidal antimicrobial hydrophilic or reticulated foam is attached to a nonwoven top sheet made of LYCRA® (spandex), wood pulp and cotton, polypropylene, polyester, or rayon or a combination thereof. Otherwise, this two part structure can be replaced with an elastomeric composite having a foam with a nonwoven top sheet formed in a single process. Preferably, in either case, the nonwoven top sheet is one manufactured by DuPont (Sontara Technology nonwoven), Dexter Synthetics, Veritex, Nordlys or the like.

The inner liner fabric is a moisture transfer fabric capable of wicking moisture. The inner liner 10 is preferably constructed using specific fabrics possessing certain desired characteristics, but with varying fiber compositions. A list of fabrics which can be employed depending upon the individual needs of their application as well as the individual needs of each skater are provided below. These fabrics may either be used individually or in combination. The following inner moisture transfer liner 10 materials may also be replaced by new moisture transfer fabrics with similar characteristics as the technology on the market develops for this invention.

The first fabric is an antimicrobial, antifungal polypropylene (also referred to as polyolefin) LYCRA® blend (2%) with INNOVA fiber, or the like. INNOVA is a continuous filament fiber (manufactured by Deercreek Fabrics, Inc. or Menra Mills).

The second fabric is an antimicrobial, antifungal polypropylene having a polyester or cotton backing or the like (such as that manufactured by Coville, Inc.). This fabric has the face of one fiber and the backing of another and may vary in composition depending on the performance level of the skater.

The third fabric is an antimicrobial, antifungal polypropylene/cotton blend with ALPHA fiber, or the like (such as that manufactured by Intex Fabric, Inc.).

The fourth fabric is a field sensor polyester with waffle weave construction (such as that distributed by Yagi & Co., Inc. and manufactured by Toray). This fabric is constructed to transfer moisture immediately away from the foot and performs best as the liner for the soft boot in-line skate. Alternatively, a polyester material known as AQUA-DRY, distributed by Teijin Shojin can be employed or the like.

The fifth fabric is a hydrophilic, antimicrobial DRI-LEX BABY KID or perforated material (such as that manufactured by Faytex Corp.).

The sixth fabric is a polyester looped terry (such as that manufactured by Kronfli Spundale Mills, Inc.).

The seventh fabric is a sueded/sanded polyester microfiber material (such as that distributed by Yagi & Co., Inc. and Teijin Shojin, Inc., Miliken or Malden Mills).

The eighth fabric is an antimicrobial, antifungal POLAR TEC Series 2000, which is a wickable, moisture transfer fiber, containing LYCRA®, polypropylene, or the like.

Finally, the ninth fabric is Shoeller DRYSKIN 61487, or the like.

All of these fabrics have good moisture transfer characteristics which prevent damage to a skater's foot by preventing excessive moisture built-up. The moisture transfer inner fabrics may vary in composition and structure in this liner system as fiber technology advances.

The moisture transfer characteristics of the inner liner 10 causes moisture vapors to be passed from a skater's body through the inner liner 10 where it then comes into contact with the first foam material 20. The moisture vapors travel through the first foam material 20 and come into contact with the abutting second foam material 30.

As discussed above, first foam material 20 may be a cellular elastomeric composite comprised of a layer of germicidal antimicrobial open cell hydrofilic polyurethane foam such as AQUAZONE and a nonwoven top sheet. All of the foam materials discussed herein are preferably polyurethane, although not specifically mentioned each time. The inclusive top sheet is preferably composed of LYCRA®, wood pulp, rayon, cotton, polypropylene, polyester, or a combination thereof. Alternatively, foam material 20 can be a foam that is separate from the nonwoven top sheet and is attached to the nonwoven top sheet by lamination, stitch bonding or the like. The nonwoven top sheet (when used) abuts the next layer of ¼" reticulated and/or open cell hydrofilic foam, or second foam material 30, The second foam material 30 may also be a germicidal antimicrobial reticulated and/or open cell hydrophilic ¼" foam, such as AQUAZONE with or without Frisby Technologies applied or COMFORTEMP. The second foam material is preferably backed with a nonwoven top sheet as mentioned above. In fact, any of the foam materials discussed herein can be backed by such a nonwoven top sheet, but the nonwoven top sheet is not absolutely necessary. Also, many of the foam materials are interchangeable depending upon specific needs. Alternatively, the foam materials can be flame laminated to a non woven apertured top sheet of cotton, polypropylene or polyester, or a blend thereof, for example.

Figure 2:
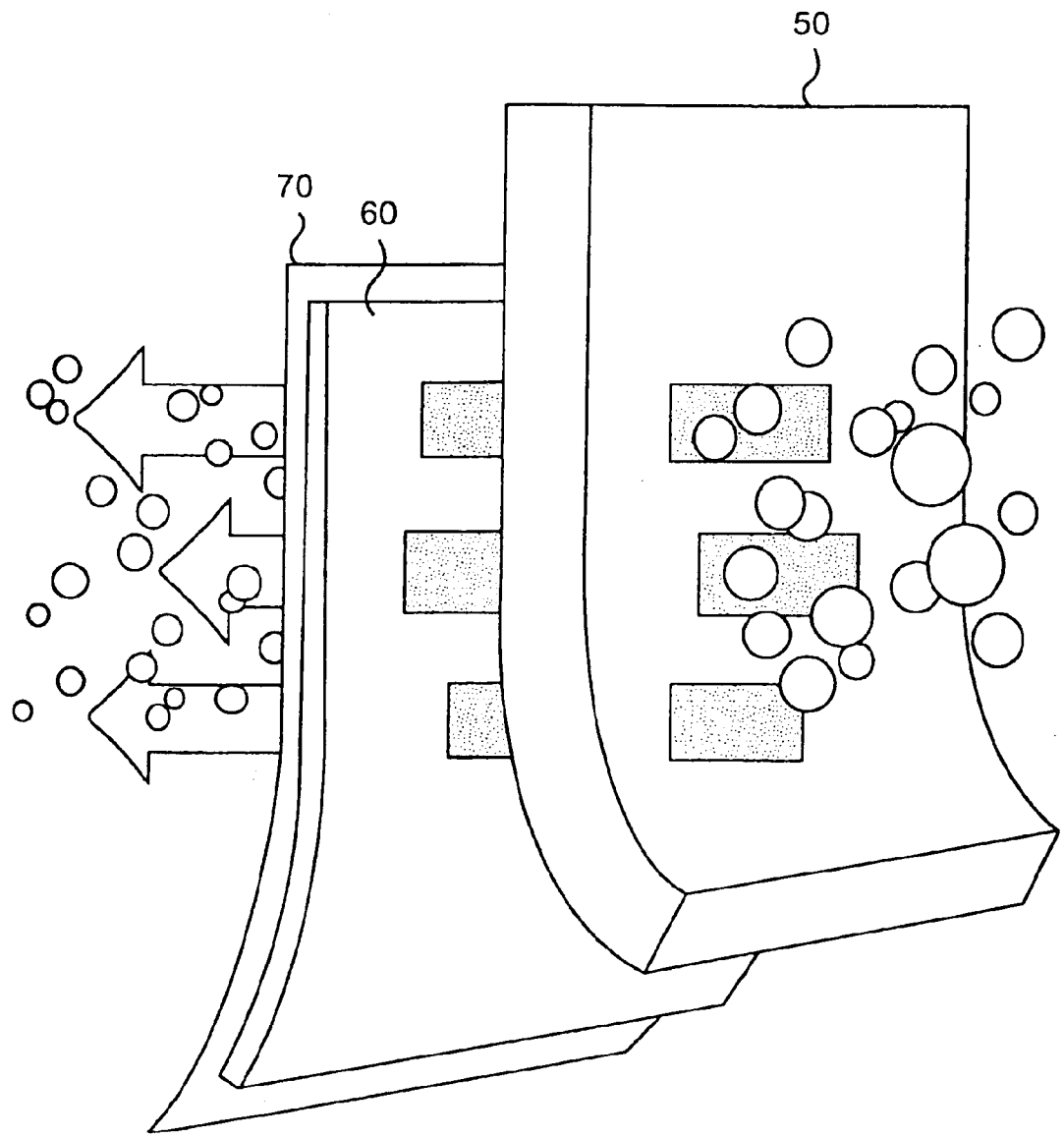
FIG. 2 illustrates a second portion of the liner according to a first embodiment of the present invention.

As shown in FIG. 2, a third foam material 50, which provides support and has similar characteristics to the second foam material 30, allows the moisture vapors to continue their movement toward the outside. This third foam material 50 is a slow recovery moldable foam (by Poron or Foamex), a polyurethane reticulated and/or open cell hydrofilic antimicrobial foam or a spacer material that functions like a moldable foam and is composed of polypropylene and polyester and is formed in certain areas to take the shape of an ankle, heel pocket and foot bones. An air bladder may also be added in the area around the ankle in place of the third foam material 50 or in combination with the shaped foam to aid in performance and support. The air bladder may be inflated by pumping the reflective grip 410 just under the pull tab. Furthermore, spacer fabrics may also be used in place of the foam or bladder 50. The moldable polyester, polyamide, polypropylene spacer materials may be such as those manufactured by Muller, Schiebler, Peltzer or Fugafil or the like in varying combinations. The environmental acceptability of many foam materials is an important factor to consider when selecting the proper materials. Material 50 is positioned so as to allow the moisture to pass through into subsequent elements, such as waterproof/breathable membrane 60 and the outer shell 70, or an encapsulated outer fabric of the overall lining system. The outer fabric may also be treated with a waterproof film and may or may not be encapsulated. The third foam material So can be designed to provide a well defined heel lift, and heel pocket. The pocket may also contain a silicon gel or the like. This invention enables improved performance with the increased support around the heel, toe and ankle. The toe box is from top to bottom, wider and more flexible than in previous liners, specifically those described in U.S. Pat. Nos. 5,092,614 and 5,397,141. The laminated foams under the heel support the skaters lower back and allows for a comfortable stride. With this added comfort, the aggressive or recreational skater can achieve a higher level of continued performance.

Figure 3:
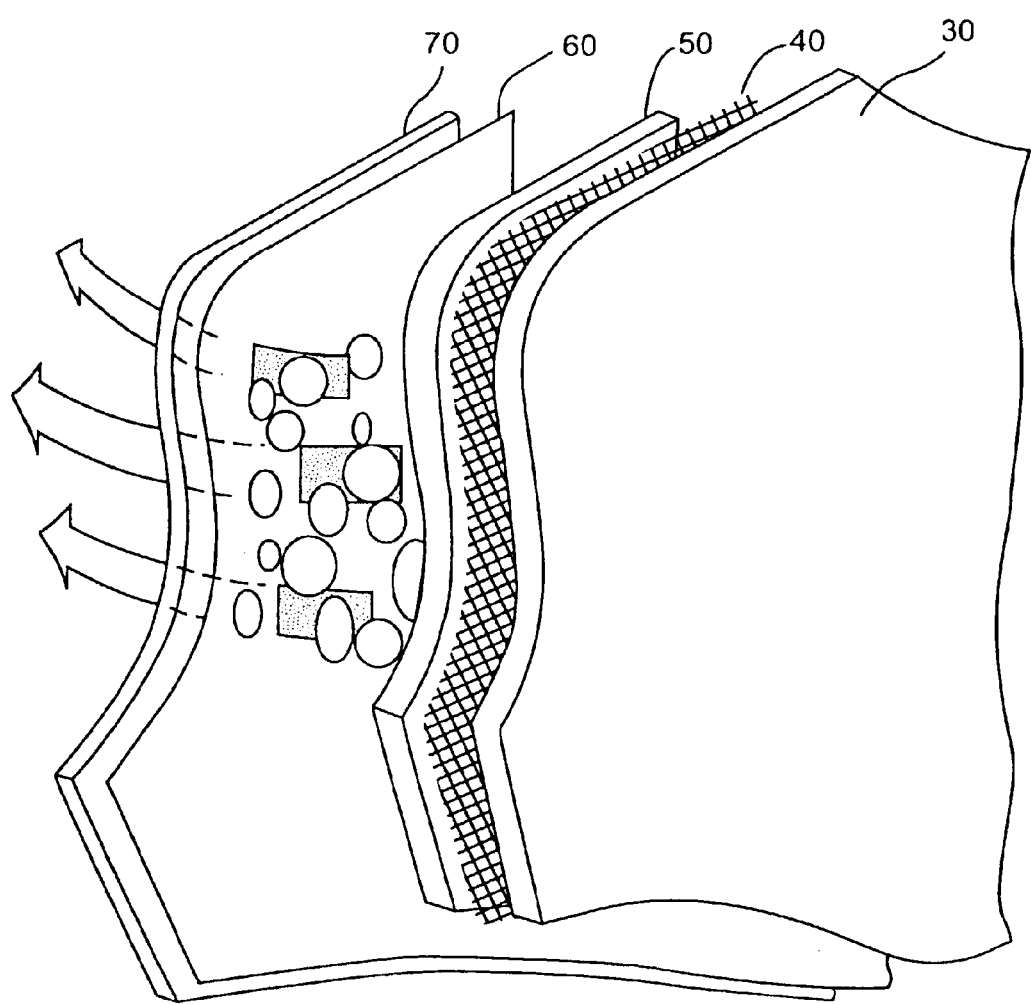
FIG. 3 illustrates an example of the liner according to the first embodiment of the present invention.

As shown in FIG. 3, between the supporting second foam material 30 and the third foam material 50 is a structural mesh 40 which can be a flex guard, for example such as one manufactured by NALTEX or Conwed Plastics, or the like, that adds structural integrity to the lining system. A moldable foam, spacer material or silicon gel or the like may also be used in place of this flex guard or an air bladder. The moldable foam may or may not be a slow recovery foam by Rogers or the like. If it is not very breathable, it can be made breathable by puncturing. Alternatively, the moldable foam is preferably similar in construction to the second foam material, and can be a polyurethane reticulated and/or open-cell hydrofilic antimicrobial germicidal foams approximately ¼ inch thick (for example, AQUAZONE, NETSORB, COMFORTEMP, or the like). A nonwoven top-sheet (with or without apertures) can be attached to the moldable foam. If a moldable foam or spacer fabric is used, then the second foam material may be omitted. Also, the moldable foam can be AQUAZONE.

As mentioned earlier, the third foam material 50 is preferably similar in construction to the second foam material, namely being either germicidal, reticulated and approximately ¼ inch thick or being germicidal, hydrophilic, and open-cell (for example, AQUAZONE). This material is preferably laminated to a nonwoven top sheet (which may or not be apertured) comprised of wood pulp, rayon, cotton, polyester, polypropylene or a combination thereof. The top sheet abuts the waterproof/breathable membrane 60 or the encapsulated outer fabrics. The outer shell fabrics may also be treated with waterproof film and may be encapsulated or followed by a breathable membrane in some performance categories. The outer fabrics may also be constructed to repel water and breathe and may not need a waterproof membrane or encapsulation in some performance categories.

Figure 4:
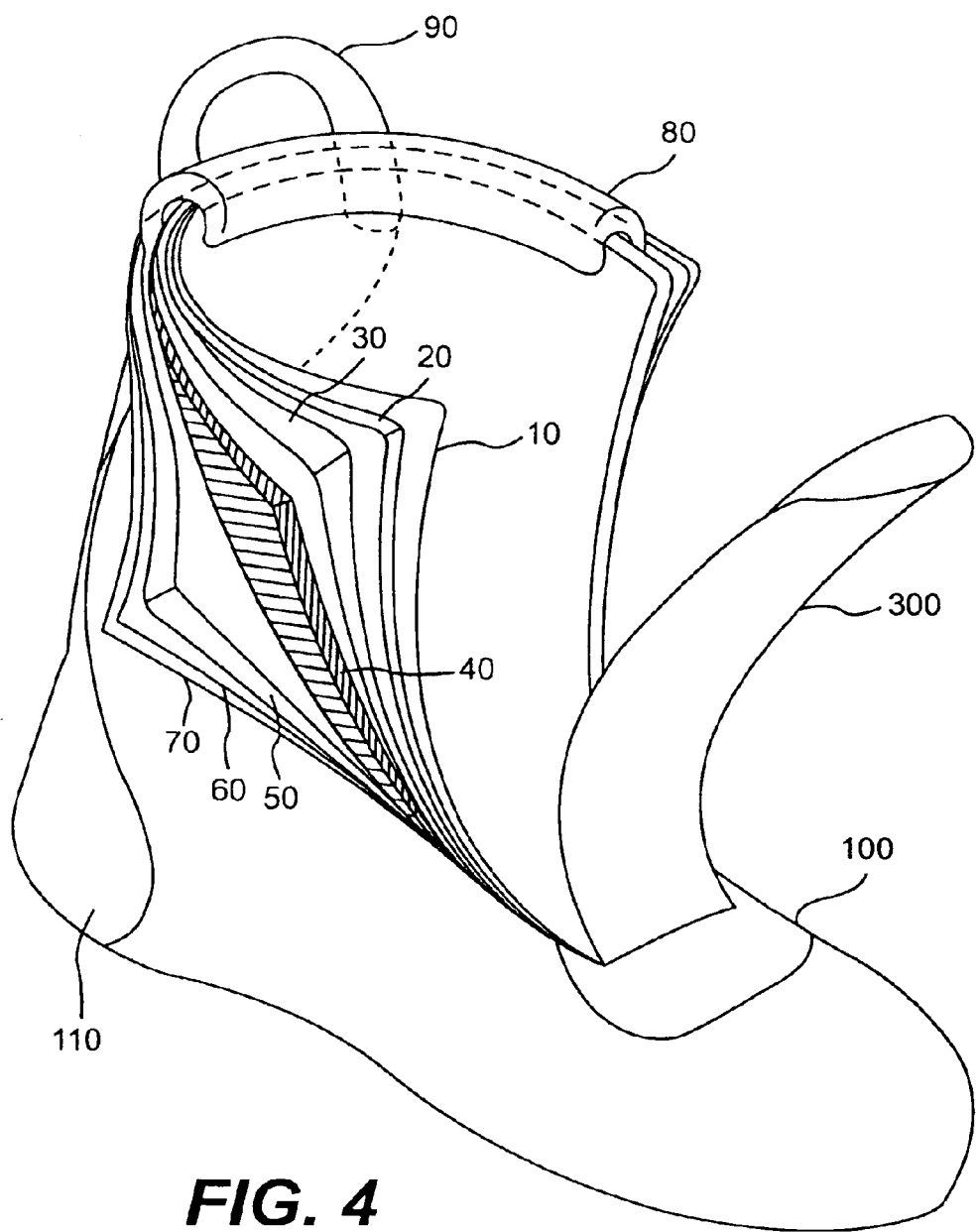
FIG. 4 illustrates the liner shown in FIG. 3 as applied to an inline skate.

The moisture vapor continues from the second foam material 30 through the mesh 40 and on through the third exterior foam material 50. If the spacer fabrics are used then the outer layer of foam material 50 may be eliminated in certain performance conditions. The moisture vapors are then passed through waterproof/breathable membrane 60 or the encapsulated outer fabrics, or the like. If the outer fabric is encapsulated, then the moisture vapors pass around the encapsulated fibers and onto the surface fabric. If the liner employs a waterproof/breathable membrane, then the moisture vapors are absorbed into the membrane and passed through to an outer layer of fabric 70, as shown in FIG. 4. The waterproof/breathable membrane 60 can be selected from a variety presently available on the market. Those under the tradenames VAPEX 2000/PLUS/STANDARD/1300, SECO-TEC, DERMIZAX, THINTECH, LAY-TEK, WITCOFLEX ECO DRY (by Baxenden Chemical), and PTFE by TETRATEC in combination with the Outlast membrane are currently being considered. However, the membrane currently being considered is TX-1540 distributed by Shawmut Mills. TX-1540 may or may not be in combination with the Outlast membrane which regulates temperature. If the preceding foam layers are COMFORTEMP or have Frisby Technology applied to the foam, then the Outlast member is eliminated. These waterproof/breathable membranes are ultra-thin, skin friendly, moisture barriers that allows moisture vapors to escape while preventing outside water from penetrating. Outlast, which is a membrane manufactured by Gateway Technologies or Frisby Technologies which is a thermabsorb microencapsulation technology can adjust to temperature changes.

A number of patents have been issued to Triangle Research & Development Corp. disclosing details related to the processes now being employed by Gateway Technologies and Frisby. For example, U.S. Pat. Nos. 4,756,958 and 5,366,801 are directed to fibers and fabrics with reversible enhanced thermal properties, respectively. The disclosures of these two patents are hereby incorporated by reference. Other patents assigned to Triangle Research & Development Corp., that are related by subject matter and have overlapping inventorship, include U.S. Pat. Nos. 5,415,222, 5,290,904, and 5,224,356. These patents are also hereby incorporated by reference.

Another patent, U.S. Pat. No. 5,499,460, which has overlapping inventorship with the above-mentioned patents, is directed to a moldable foam insole with reversible enhanced thermal storage properties. The disclosure of this patent is hereby incorporated by reference, and is illustrative of one type of moldable foam that can be used as mentioned herein.

Also shown in FIG. 4 is a protective rim or cuff 80, preferably made of neoprene covered by LYCRA®. Also, a germicidal hydrophilic open cell and/or reticulated foam by Foamex or Vita Olympic, for example, can be used. A pull tab 90, preferably made of nylon, is connected to the protective rim 80. An abrasive protective material 100 is provided adjacent to a tongue 300. Another abrasive protective material 110 is provided around the heel portion of the shoe. Abrasive protective material 110 is supplied by Schoeller or DuPont, for example.

The outer layer of fabric 70 of the lining system has 200 to 6000 denier strength and is made waterproof by a membrane, encapsulation technology or a waterproof film. If the waterproof film is applied to the outer fabric, then the membrane or encapsulation technology may be omitted. Encapsulation technology is being utilized by company called Nectex, Inc. or Toray, Inc. (a Japanese company or the like). The breathable membranes preserve the outer layer of fabric 70 and perform as a waterproof barrier for the liners. If the encapsulation technology is applied to the outer layer of fabric 70, then the breathable laminate membranes need not be used. The encapsulation technology regulates the degree of waterproofness and breathability of the outer fabric shell by encapsulating an internal layer of fibers within the outer fabric. If the encapsulated fiber layer is closest to the fabric surface, the fabric is very waterproof and less breathable. If the layer is in the middle of the outer shell fabric, then the fabric is equally waterproofed and breathable.

The outer layer of fabric 70 is a combination of extremely durable, lightweight materials, KEVLAR/KEPROTEC products 13207, 13624, 13632, 6500, 14705, 65563, 13602, 13408 (manufactured by Schoeller, Inc.), the Schoeller SPIRITSPIRIT LINE 14138, 14118, 14140, 14120, 14124, 14126, 14128, 14134, 14642, 14643, 14641, 14645, 14636, 14637, 14122, 14132, 14640, nylon supplex (such as that manufactured by Travis Textiles, Inc. or Blank Textiles, Inc.), nylon cordora (manufactured by Schoeller, Inc.), other cordoras (manufactured by Schoeller or DuPont), maxus 6 ply (manufactured by Blank Textiles, Inc.) or STARLITE DRI-LEX nylon fabric (manufactured by Faytex Corp.), MOJAVE or TUDOR (both manufactured by Travis Textiles, Inc.), MICROFT (manufactured by Teijin), ENTRANT GIL and DERMIZAX (both manufactured by Toray), GYMSTAR PLUS (manufactured by Unitika), ULTREX High Performance Fabrics (manufactured by Burlington, DuPont, Schoeller or the like), or the like, or other fabrics having similar characteristics as these new products. Also, the TYPAR nonwovens by Sontara Technologies can be used in combination with outer fabrics and are not to be confused with the nonwoven top sheets attached to the inner foam materials. Instead, this is a high abrasion, moisture transfer, absorbent material that is a spun lace (polypropylene) moisture management product, such as Sontara Technology nonwoven, manufactured by DuPont, for example.

Selecting the proper materials depends upon the needs of each individual skater. The non-abrasive cool fabrics used in the inner liner of the present invention greatly reduces the possibility of trapped moisture, thereby protecting the foot from fungus growth and any damage. The more aggressive skaters need a moisture transfer liner that can remove large amounts of moisture continuously from the foot. These skaters often do not wear socks and as a result, calluses, abrasions and blisters become commonplace. A wetting agent may be applied to any of the inner lining materials 20 to enhance the moisture transfer away from the foot. The antimicrobial antifungal polypropylene (polyolefin) fabrics quickly remove moisture away from the foot. Skin damage in minimized because the polypropylene fabric has a smooth, continuous surface. This fabric also prevents bacterial build-up which can cause foot odor and fungus.

The looped polyester terry blend or the like is an excellent wicking fabric and can remove moisture rapidly. A wetting agent by Witco, or the like, may be applied to enhance wickability.

The antimicrobial, antifungal DRI-LEX nylon fabrics, like the polypropylene, is sanded and soft. The material not only removes moisture from the foot, but also is extremely comfortable and cool to the touch.

The polyester field sensor fabric or the like works well with those individuals who prefer sports or recreational skating. This liner absorbs moisture immediately and is recommended for the soft boot inner liner.

Finally, polyester microfiber fabric is advantageous in that it is cool to the touch, smooth and wickable. A wetting agent treatment enhances wickability.

As a result of using this lining system, the skater continues to have a cooler, drier foot. The lightweight KEVLAR, STARLITE and cordura, or the like, outer liner materials are twice as durable as the former heavyweight nylons often used on the outer shell, but function as a softer feeling breathable outer surface and aid in the moisture transfer.

FIGS. 5(*a*) and 5(*b*) illustrate a sole portion 200 of a foot foam pad covered with cambrelle DRI-LEX nylon, or the like. Preferably, however, the foot pad is designed using Sontara Technology nonwoven, by DuPont, and called ComforMaxSPORT. ComforMaxSPORT, or the like, is backed by hydrophilic moldable foam and helps protect foot bed from rubbing due to friction. The inserted hydrophilic antimicrobial foam (an open cell moisture vapor transfer foam) or slow recovery punctured foam foot pad adds support and transfers moisture downward. The bottom portion of the foam is preferably provided with a nonwoven top sheet as described earlier, a material called SARAN@CLIMATE INSOLES by Fugafil or SUMMUNTEX 1, 2 by Textel may also be used in place of the foam foot bedfoot. The heel pocket foam or gel protects the back of the heel with a double layered reticulated and/or slow recovery moldable foam. This cushion protector allows circulation in the heel. ComforMaxSPORT or an antimicrobial cambrelle DRI-LEX nylon 210, or the like, covers a molded hydrophilic foam 220 that supports the arch and insures the skater a comfortable stride.

Figure 6:
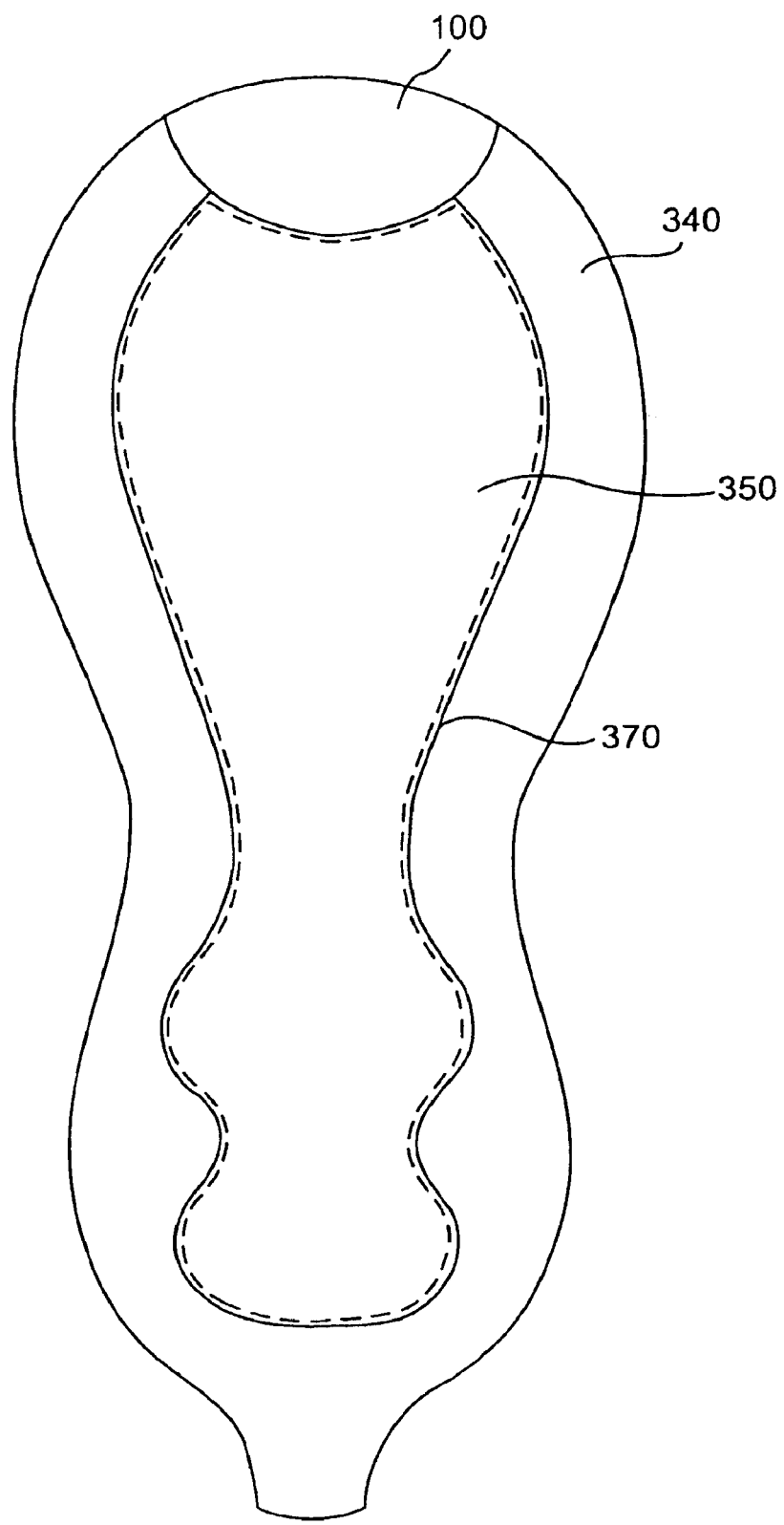
FIGS. 6 and 7 illustrate a tongue portion of a shoe constructed according to a first embodiment of the present invention.
Figure 7:
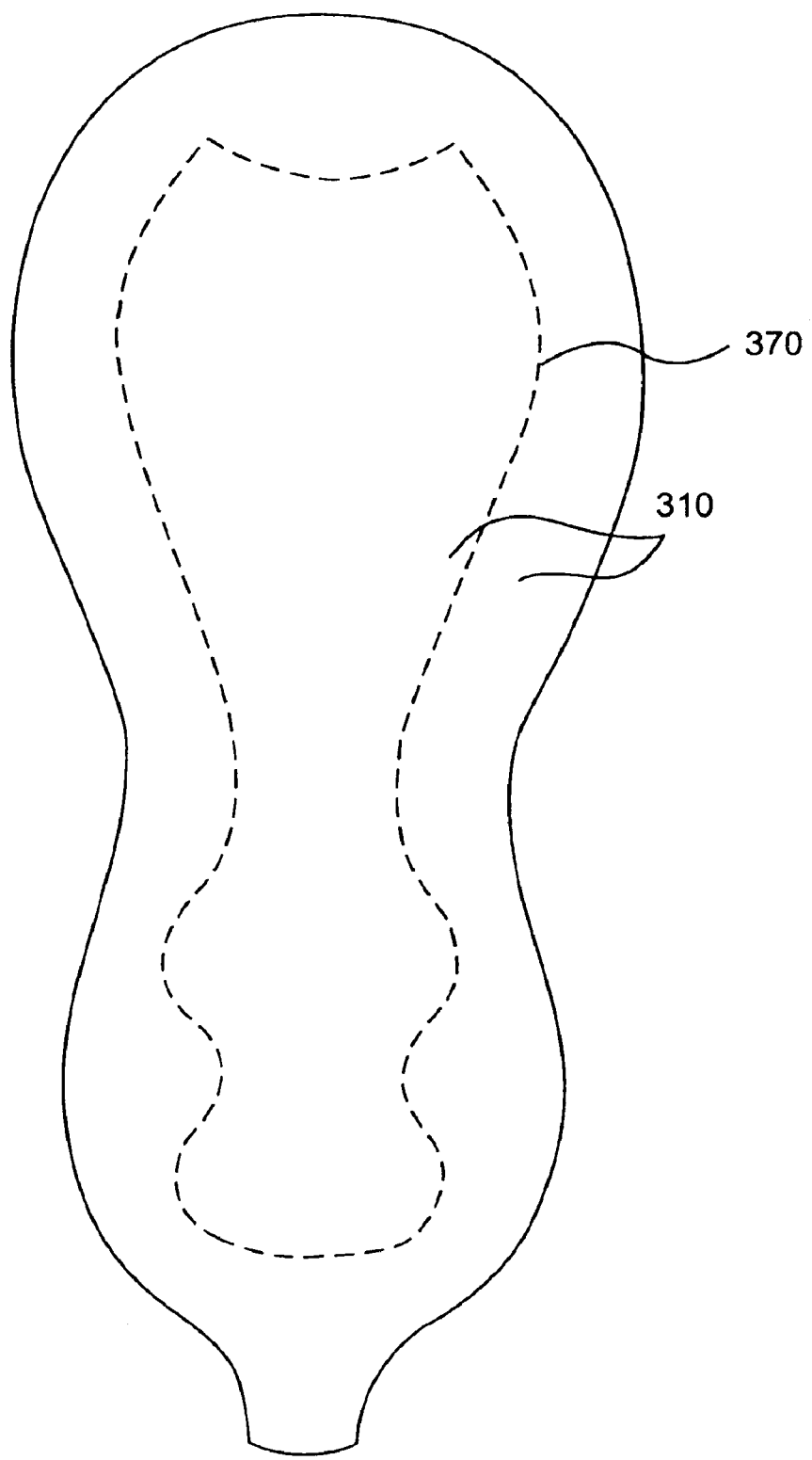
Figure 8:
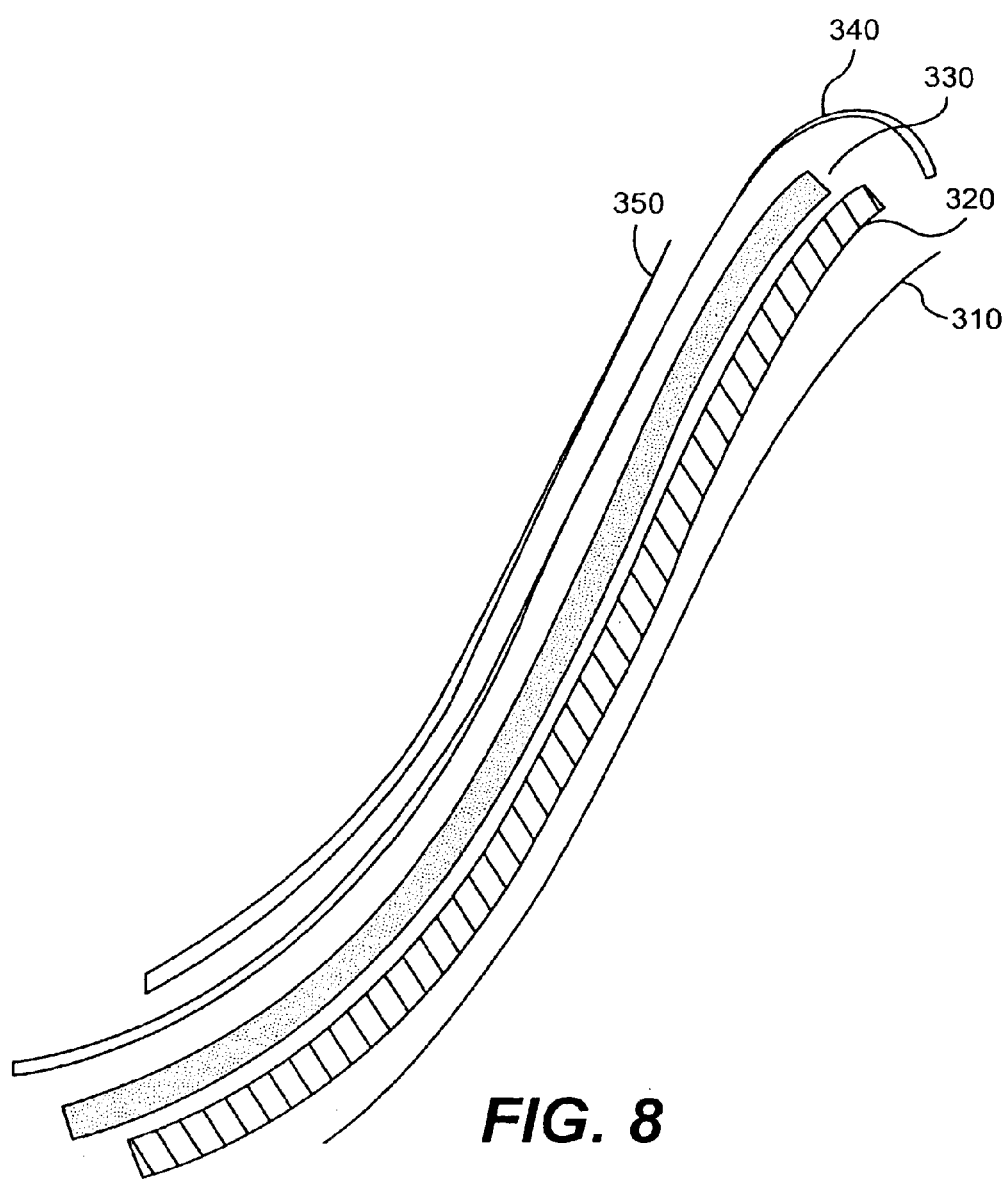
FIG. 8 illustrates a more detailed view of the liner portion used for the tongue of FIGS. 6 and 7.

FIGS. 6, 7 and 8 illustrate the tongue 300 of the boot in more detail. The tongue is designed to add further comfort and support. As shown in FIG. 8, an inner liner fabric 310 of the tongue 300 is preferably one of the other inner liner materials mentioned above, especially the polypropylene LYCRA® blend with INNOVA fiber, the polyester microfiber or the polyester looped terry or the like. This inner liner fabric 310 is preferably laminated to a structural support foam 320, which is preferably a ¼ inch antimicrobial reticulated and/or slow recovery punctured foams. A hydrophilic open cell or reticulated perforated foam 330 abuts a structural support foam 320. The hydrophilic open cell or the slow recovery perforated foams 330 can take the shape of the foot bones and protect the upper foot from damage. A moldable spacer material may also be used in combination with foam 330 or in some cases in place of the foam 330. The structural support 320 can also be shaped to accommodate the foot and protect the ankle bones. A moisture transfer material 340 lies over the outer edges of the hydrophilic perforated foam or combination foam and spacer material 330 and is connected to the inner liner 310 and underlies the outer protective polyurethane layer 350. This moisture transfer material 340 is preferably made from a material known as aero-spacer DRI-LEX, which is manufactured by Faytex Corp, or an aero-spacer fabric manufactured by Apex Mills or the like. Optionally, a nonwoven material such as Sontara Technology manufactured by DuPont can be used.

The nonwoven material, Sontara Technology, is a spun lace moisture management product called TYPAR, for example. It can have a sanded surface treatment or it can look like steel wool and would wrap around the top of the tongue. It should be understood that these nonwoven materials can always be substituted for the aero-spacer DRI-LEX, even if not specifically mentioned in other parts of this disclosure. This material 340, is wrapped around the outer edge of the tongue to allow moisture vapors traveling from the upper foot area to escape through moisture transfer material 340 to the outer surface of the tongue 300. Material 340 also aids in providing a softer edged tongue. Finally, an outer protective polyurethane layer 350, or the like, is provided over a central portion of the material 340. Another hydrophilic open cell foam or slow recovery punctured foam (not shown) is shaped to fit between the outer protective polyurethane layer, cordura nylons, KEVLAR or synthetic breathable leathers (by Daowoo Corporation, for example) 350 or the like are surrounded by aero spacer DRI-LEX 340, or a substitute as mentioned above, or the like. The protective polyurethane layer may be optional in both the shell liner and the soft boot. If the protective polyurethane layer is omitted, then the slow recovery foam (not shown) or open cell foam may also be omitted.

As shown in FIG. 6, polyurethane, KEVLAR fabrics or synthetic breathable leather layer (by Daewoo Corp. for example) 350 is surrounded by aero-spacer DRI-LEX 340, or a substitute as mentioned above. At the top of the tongue 300 is an abrasive grip fabric 100 (such as a that is manufactured by Schoeller and identified by the number 6500), also shown in FIG. 4. Stitching is identified by numeral 370. FIG. 7 illustrates a top portion of the tongue 300, and shows stitching 370 and the inner liner fabric 310. It is recommended that LYCRA® and nylon thread such as those used by the DuPont Xymid Group or Tietex be used for these stitched areas or adhesive bonding by Applied Extrusion Technologies, or the like. In fact, adhesive bonding may be utilized in place of or in combination with several stitched areas on the outer liner fabrics.

In-line skate tongues have in the past been hard vinyl edged forms. The shape of these tongues often did not fit the skater's foot. Furthermore, vinyls may damage the upper foot where they meet the inner lining edge during active use of the in-line skate. As a result, the skater may develop blisters, calluses or bruises on this upper foot area. Additionally, the inner fabrics of the tongue liner have often been non-breathable nylon or vinyl, thereby increasing the possibility of foot bacteria fungus to develop.

Figure 9:
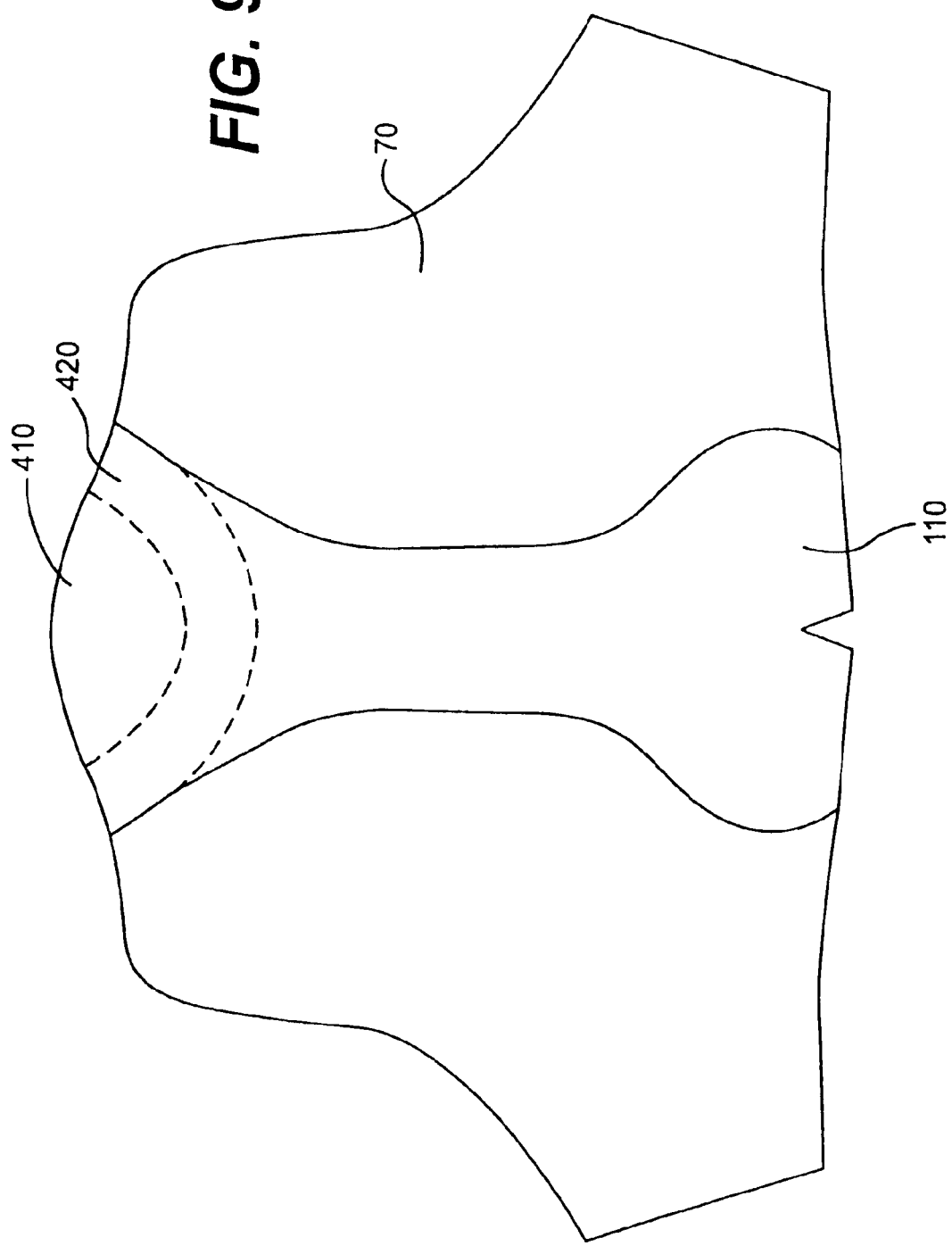
FIG. 9 illustrates a portion of the liner used in the upper cuff area.
Figure 10:
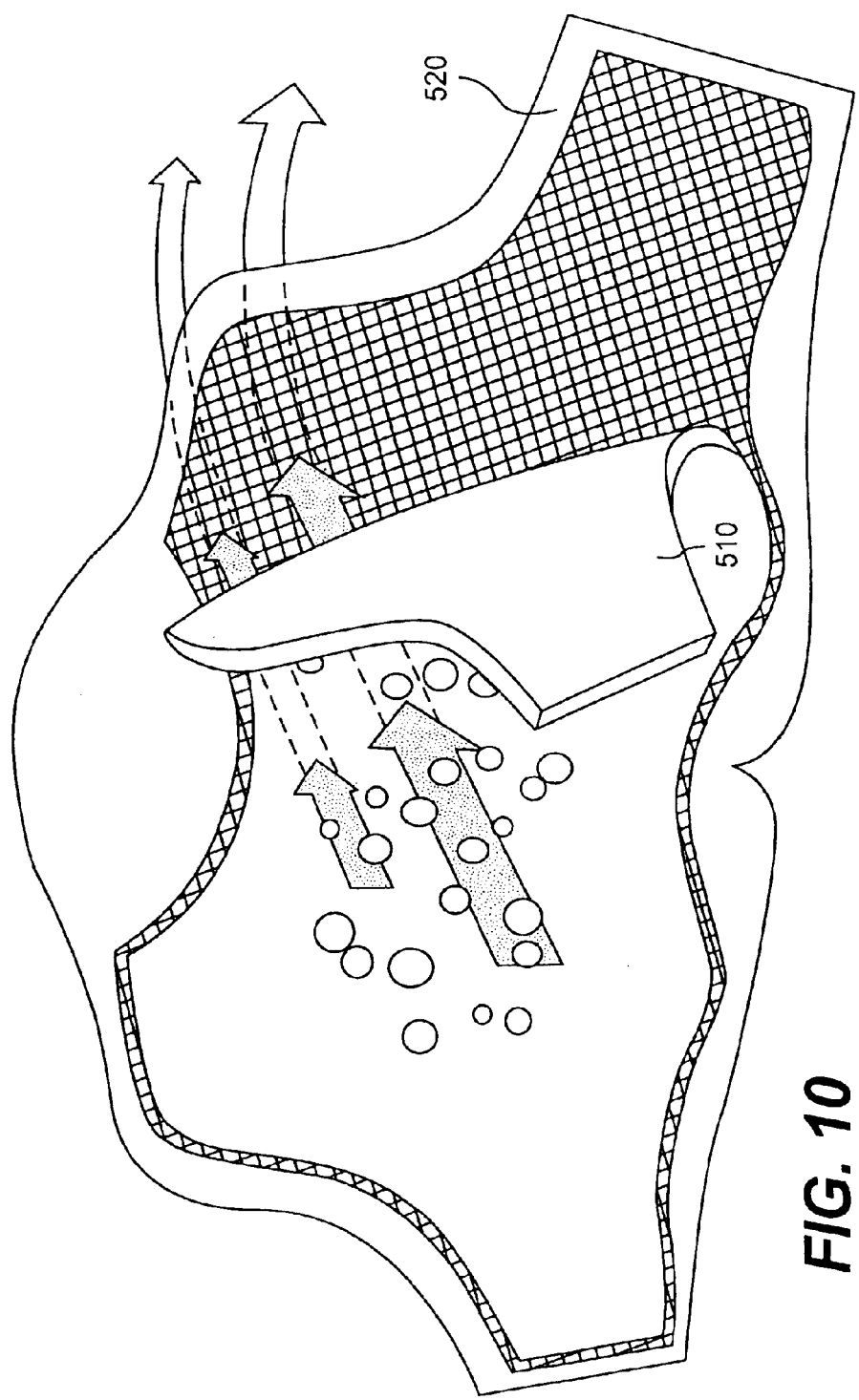
FIG. 10 illustrates the travel of moisture through a reticulated foam then a flexible mesh and into and through a breathable membrane according to the first embodiment of the present invention.

The liners are preferably provided with a pull tab 90 as illustrated in FIGS. 4, 9 and 10 on the back of a cuff 80 constructed of neoprene or reticulated foam covered by LYCRA®, or the like. FIG. 9 shows an opened up version of the liner looking from the back of the shoe. The outer upper cuff, that is exposed above the shell of the in-line skate removable liner, is provided to protect a skater's leg from abrasion. Located just beneath the cuff 80 is a abrasive grip fabric material 410, such as that manufactured by Schoeller, Inc. and referred to by the number 6500, or the like. Below material 410 is a reflective grip material 420. Below the reflective grip material 420 is a highly abrasive fabric 110, as shown in FIG. 4. The reflective material 14209 by Schoellar may also be used as fabric 110. Fabric 110 is preferable a KEVLAR by Toray-DuPont or Schoeller (KEPROTEC or Schoeller SPIRIT) or the like, STARLITE, cordura, or the like. Finally, outer shell fabric 70 is the same as that shown in FIG. 4, and can be any of the fabrics listed previously in connection with outer shell fabric 70. The nylon pull tab 90 allows the skater to easily slip into the liner.

FIG. 10 shows the other side of the liner of FIG. 9. In FIG. 10, 510 can be a ¼ inch punctured moldable foam, spacer fabric or an air bladder of a similar shape. The foam and air bladder may also be used in combination. Alternatively, the moldable foam can be substituted by a reticulated or hydrophilic, open-cell foam or silicon gel or the like. A nonwoven top-sheet (with or without apertures) can be attached to the moldable foam. Also, a spacer material, such as that made by Müller or the like, can be used as material 510. 520 represents the combination of the flexible mesh (in the case the moldable foam is not used, as depicted), the breathable membrane and the outer shell fabric, or encapsulated outer shell fabric. As in all of the Figures, the arrows depict the flow of moisture.

Figure 11:
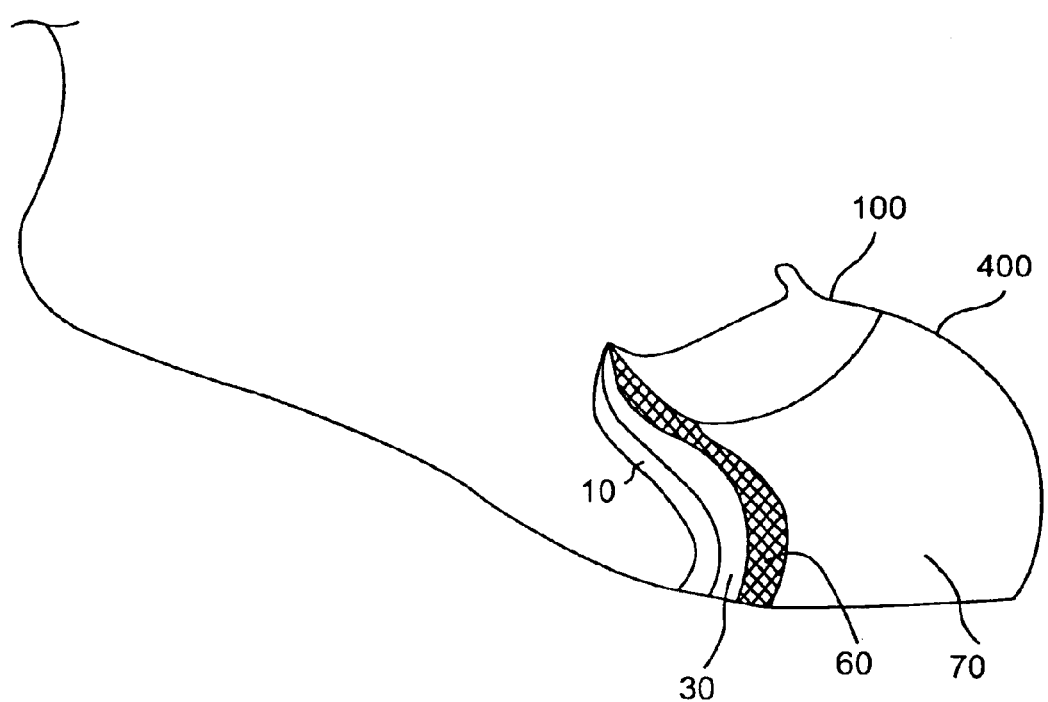
FIG. 11 illustrates the toe portion of a shoe according to a preferred embodiment of the present invention.

FIG. 11 illustrates the toe portion 400 of the shoe. Preferably, the toe portion 400 is constructed with an inner liner 10, followed by a foam material 30, followed by a breathable membrane 60 and finally followed by the outer fabric 70 or encapsulated outer shell fabrics. Abrasive grip fabric 100 is also shown.

The 6500 high abrasive fabrics manufactured by Schoeller, Inc., or the like, are located on the back of the cuff and the top of the toe box, heel, and tongue grip area. The KEVLAR and cordura STARLITE fabrics provide comfort and durability to the liners and are extremely strong and resistant to abrasion and allow for breathability and performance.

The microfiber technology disclosed above is rapidly developing and changing and has greatly increased the potential for improved performance of such products such as in-line skates, provided that they are properly utilized as in the present invention. These new products are part of rapidly developing fabric technology. The present invention employs a combination of fabrics, foam layers, nonwovens, spacer fabrics, breathable membranes, encapsulated technology, structural woven water repellent fabrics, or waterproof film coatings in such combinations that increase the performance of the products in which they are used as well as increase breathability. The waterproof/breathable membranes have also only recently developed and are believed to be less than ten years old.

It should be noted that, in the case of in-line skates, the lining system of the present invention can be applied to both shell boots and soft boots. The soft boot in-line skate, mentioned earlier in the Background of the Invention, addressed the needs of a skater to have more flexibility and comfort yet still maintain performance levels. This new technology in the in-line skate industry has increased tremendously the possibilities of a lighter weight performance product. However, the soft boot in-line skate does not have any type of lining system that even remotely resembles the lining system of the present invention. The liner of the soft boot can be adapted to this new moisture transfer system.

While the soft boot does not have a protective shell, nor a removable liner, it can nonetheless be provided with a liner that enjoys all of the benefits of the liner according to the present invention. Preferably, the outer layer of the moisture transfer system for the soft boot application would be a STARLITE DRI-LEX nylon, KEVLAR, or high abrasion cordura fabric, such as that manufactured by Schoeller, or the like. These fabrics, as well as the high abrasive fabrics, are encapsulated or are provided with a waterproof/breathable membrane laminated to their back or are encapsulated. A reticulated and/or open cell hydrophilic antimicrobial germicidal ¼" foam abuts the encapsulated outer fabric or breathable membrane. The structural mesh or molded spacer material is stitch bonded or laminated to the ¼ reticulated or open cell hydrofilic foam. A slow recovery punctured foam or silicon gel, or the like, are located in the heel pocket is located both in the heel pocket, toe and tongue areas. An air bladder may also be added around the ankle areas to increase performance in some cases. The structural mesh or molded spacer materials abut a nonwoven top sheet that is laminated, stitch or ultra sonically bonded to a reticulated and/or open cell hydrofilic ¼" foam. The ¼" foam abuts preferably a cellular elastomeric composite which is laminated to the inner fabric. A nonwoven top sheet laminated to ⅛" foam may also be used in place of the elastomeric composite. Also, instead of being removable, the liner would preferably be directly attached to the base of the soft boot by methods well known in the art, such as that disclosed in U.S. Pat. No. 5,437,466. Substitutions can be made to all of the foam materials (ie. hydrophilic open cell, AQUAZONE, etc.) just as discussed earlier, and are not specifically repeated here. Other aspects of the present invention can be applied to the soft boot without any significant structural changes. The soft boot density is increased in the footbed, toe box, and heel plate. This added support provides, protection and assist in maintaining technical performance levels. The in-line soft boot breathability would be greatly enhanced with this added moisture transfer liner system. The soft boot may also employ the nonwoven top sheets in a number of combinations with the foam layers to increase moisture transfer.

Also, the soft boot outer shell may be a combination of synthetic breathable leather (such as that available from Daewoo, Inc. or the like), an encapsulated, waterproof film or breathable membrane outer fabric by DuPont, Schoeller, Burlington, Malden Performance Fabrics or any of the former fabrics mentioned, or the like, as well as synthetic rubbers, PVC, TPR or TPU, a thermoplastic composite material. TYPAR Nonwovens by Sontara Technologies, or the like, may be used in combination with the outer materials in high abrasion areas.

The outer shell combined materials are then laminated, stitched or ultrasonically bonded, or the like, to interior foam layers. An air bladder may be added in combination with or in place of the molded foam and structural mesh to aid in comfort and performance. If the internal layers of foam and nonwovens are stitch bonded, it is recommended that the process with LYCRA® thread by the Xymid Group of DuPont be used or the process developed by Tietex with nylon thread, or the like. The outer shell fabric seams may be stitched or adhesively bonded.

The inner moisture transfer fabrics are any of the former fabrics listed, as suggested for the removable liner, or the like. The foam is either AQUAZONE, Vita Olympic, NETSORB, or the like, in combination with a nonwoven top sheet as mentioned or the foam-nonwoven combination may be replaced with a foam/top sheet composite referred to as a cellular elastomeric composite. Presently, this invention is considering the use of a breathable polyester and/or polypropylene filtering material produced by Vitafibers QW 110 –QW 150 quiet web or Tangerding Vliesstoffe (TH-FI 210 B or FF-FI 250). These materials may be substituted for the reticulated or open cell foams previously mentioned, materials 30 and 50 for example.

While the present invention has been described above in connection with the preferred embodiments, one of ordinary skill in the art would be enabled by this disclosure to make various modifications to the disclosed embodiments and still be within the scope and spirit of the present invention as recited in the appended claims.

What is claimed is:

1. A moisture transfer composite comprising a plurality of layers arranged to transfer moisture in a predetermined direction, the moisture transfer composite comprising:
    an inner fabric layer;
    an outer fabric layer positioned relative to the inner fabric layer in the direction of moisture flow, wherein moisture flows from the inner fabric layer through any intermediate layers and then through the outer fabric layer; and
    at least one foam material positioned between the inner fabric layer and the outer fabric layer, wherein the outer fabric layer is made to have waterproof/breathable characteristics and wherein the foam material is an open-cell foam that is positioned adjacent to a nonwoven material and wherein microencapsulation technology which can adjust to temperature changes is applied to either the foam material or nonwoven material thereby giving either material reversible enhanced thermal properties.

2. The moisture transfer composite according to claim 1, wherein a wetting agent is applied to the inner fabric layer in order to increase moisture transfer.

3. The moisture transfer composite according to claim 1, wherein the outer fabric layer is made to have waterproof/breathable characteristics by attaching a waterproof/breathable membrane thereto.

4. The moisture transfer composite according to claim 1, wherein the outer fabric layer is made to have waterproof/breathable characteristics by application of a waterproof film.

5. The moisture transfer composite according to claim 1, wherein the foam material has reversible enhanced thermal properties.

6. The moisture transfer composite according to claim 5, wherein said nonwoven material includes at least one material selected from a group consisting of spandex, wood pulp, cotton, polypropylene, polyester and rayon.

7. The moisture transfer composite according to claim 1, wherein the inner fabric layer includes at least polyester or a polyester blend.

8. The moisture transfer composite according to claim 1, wherein said nonwoven material includes at least one material selected from a group consisting of spandex, wood pulp, cotton, polypropylene, polyester and rayon.

9. The moisture transfer composite according to claim 1, wherein the microencapsulation technology is applied by using a membrane.

10. The moisture transfer composite according to claim 1, wherein the foam material and nonwoven material are formed in a single process as an elastomeric composite.

11. The moisture transfer composite according to claim 1, wherein the application of microencapsulation technology includes application of microcapsules containing phase change materials (PCMs).

12. The moisture transfer composite according to claim 11, wherein the microcapsules containing PCMs are applied to the foam material or the nonwoven material as a coating.

13. The moisture transfer composite according to claim 11, wherein the microcapsules containing PCMs are applied so as to be integrally present in the foam material or the nonwoven material.

14. The moisture transfer composite according to claim 1, wherein the outer fabric layer is made to have waterproof/breathable characteristics by employing encapsulation technology.

15. The moisture transfer composite according to claim 1, wherein the outer fabric layer is made to have waterproof/breathable characteristics by employing encapsulation technology.

16. A moisture transfer composite comprising a plurality of layers arranged to transfer moisture in a predetermined direction, the moisture transfer composite comprising:
    an inner fabric layer;
    an outer fabric layer positioned relative to the inner fabric layer in the direction of moisture flow, wherein moisture flows from the inner fabric layer through any intermediate layers and then through the outer fabric layer; and
    at least one foam material positioned between the inner fabric layer and the outer fabric layer, wherein the foam material is an antimicrobial, germicidal, open-cell foam that is positioned adjacent to a nonwoven material, and wherein the outer fabric layer has waterproof/breathable characteristics; and wherein microencapsulation technology which can adjust to temperature changes is applied to either the foam material or nonwoven material thereby giving either material reversible enhanced thermal properties.

17. The moisture transfer composite according to claim 16, wherein a wetting agent is applied to the inner fabric layer in order to increase moisture transfer.

18. The moisture transfer composite according to claim 16, wherein the outer fabric layer is made to have waterproof/breathable characteristics by attaching a waterproof/breathable membrane thereto.

19. The moisture transfer composite according to claim 16, wherein the outer fabric layer is made to have waterproof/breathable characteristics by either the application of a waterproof film or by the application of a waterproof coating.

20. The moisture transfer composite according to claim 16, wherein the inner fabric layer includes at least polyester or a polyester blend.

21. The moisture transfer composite according to claim 16, wherein said nonwoven material includes at least one material selected from a group consisting of spandex, wood pulp, cotton, polypropylene, polyester and rayon.

22. The moisture transfer composite according to claim 16, wherein microencapsulation technology is applied by using a membrane.

23. The moisture transfer composite according to claim 16, wherein the foam material and nonwoven material are formed in a single process as an elastomeric composite.

24. The moisture transfer composite according to claim 16, wherein the application of microencapsulation technology includes application of microcapsules containing phase change materials (PCMs).

25. The moisture transfer composite according to claim 24, wherein the microcapsules containing PCMs are applied to the foam material or the nonwoven material as a coating.

26. The moisture transfer composite according to claim 24, wherein the microcapsules containing PCMs are applied so as to be integrally present in the foam material or the nonwoven material.

27. A moisture transfer composite which transfers moisture through a plurality of layers comprising:
an inner moisture transfer layer;
a foam material positioned adjacent to the inner moisture transfer layer, and
a nonwoven material positioned adjacent to the foam layer, wherein moisture is transferred from the inner moisture transfer layer, through the foam layer and subsequently through the nonwoven material and wherein microencapsulation technology which can adjust to temperature changes is applied to either the foam material or nonwoven material thereby giving either material reversible enhanced thermal properties.

28. The moisture transfer composite according to claim 27, wherein the foam material has reversible enhanced thermal properties.

29. The moisture transfer composite according to claim 28, wherein said nonwoven material includes at least one material selected from a group consisting of spandex, wood pulp, cotton, polypropylene, polyester and rayon.

30. The moisture transfer composite according to claim 27, wherein the foam material is an open cell foam material.

31. The moisture transfer composite according to claim 27, wherein said nonwoven top material includes at least one material selected from a group consisting of spandex, wood pulp, cotton, polypropylene, polyester and rayon.

32. The moisture transfer composite according to claim 27, wherein the inner moisture transfer layer includes at least polyester or a polyester blend.

33. The moisture transfer composite according to claim 27, wherein microencapsulation technology is applied by using a membrane.

34. The moisture transfer composite according to claim 27, wherein the foam material and nonwoven material are formed in a single process as an elastomeric composite.

35. The moisture transfer composite according to claim 34, wherein the elastomeric composite has microencapsulation technology applied thereto by application of microcapsules containing phase change materials (PCMs).

36. The moisture transfer composite according to claim 35, wherein the microcapsules containing PCMs are applied to the elastomeric composite as a coating.

37. The moisture transfer composite according to claim 35, wherein the microcapsules containing PCMs are applied so as to be integrally present in the elastomeric composite.

38. The moisture transfer composite according to claim 34, wherein the elastomeric composite has microencapsulation technology applied thereto by application of a membrane.

39. The moisture transfer composite according to claim 27, wherein the application of microencapsulation technology includes application of microcapsules containing phase change materials (PCMs).

40. The moisture transfer composite according to claim 39, wherein the microcapsules containing PCMs are applied to the foam material or the nonwoven material as a coating.

41. The moisture transfer composite according to claim 39, wherein the microcapsules containing PCMs are applied so as to be integrally present in the foam material or the nonwoven material.

\* \* \* \* \*